US010472281B2

(12) United States Patent
Kumar et al.

(10) Patent No.: US 10,472,281 B2
(45) Date of Patent: Nov. 12, 2019

(54) POLYURETHANE COMPOSITES WITH FILLERS

(71) Applicant: BORAL IP HOLDINGS (AUSTRALIA) PTY LIMITED, North Sydney (AU)

(72) Inventors: Amitabha Kumar, San Antonio, TX (US); Li Al, San Antonio, TX (US); Russell Hill, San Antonio, TX (US)

(73) Assignee: BORAL IP HOLDINGS (AUSTRALIA) PTY LIMITED, North Sydney (AU)

( * ) Notice: Subject to any disclaimer, the term of this patent is extended or adjusted under 35 U.S.C. 154(b) by 0 days.

(21) Appl. No.: 16/023,536

(22) Filed: Jun. 29, 2018

(65) Prior Publication Data

US 2018/0305259 A1 Oct. 25, 2018

Related U.S. Application Data

(63) Continuation of application No. 15/301,083, filed as application No. PCT/US2015/060403 on Nov. 12, 2015, now abandoned.

(51) Int. Cl.
| | |
|---|---|
| *C04B 26/00* | (2006.01) |
| *C04B 26/16* | (2006.01) |
| *C04B 28/02* | (2006.01) |
| *C04B 20/10* | (2006.01) |
| *C08K 7/14* | (2006.01) |
| *C08K 7/18* | (2006.01) |
| *C08K 7/28* | (2006.01) |
| *C04B 14/06* | (2006.01) |
| *C04B 14/42* | (2006.01) |
| *C04B 18/08* | (2006.01) |
| *E04C 1/00* | (2006.01) |
| *C04B 20/00* | (2006.01) |
| *C04B 38/10* | (2006.01) |
| *C08L 75/04* | (2006.01) |
| *C04B 111/00* | (2006.01) |
| *C04B 111/28* | (2006.01) |
| *C04B 111/52* | (2006.01) |
| *C08K 3/013* | (2018.01) |

(52) U.S. Cl.
CPC ............ *C04B 26/16* (2013.01); *C04B 14/06* (2013.01); *C04B 14/42* (2013.01); *C04B 18/08* (2013.01); *C04B 20/0048* (2013.01); *C04B 20/1003* (2013.01); *C04B 28/021* (2013.01); *C04B 38/10* (2013.01); *C08K 7/14* (2013.01); *C08K 7/18* (2013.01); *C08K 7/28* (2013.01); *C08L 75/04* (2013.01); *E04C 1/00* (2013.01); *C04B 2111/00586* (2013.01); *C04B 2111/00612* (2013.01); *C04B 2111/28* (2013.01); *C04B 2111/52* (2013.01); *C08K 3/013* (2018.01); *C08K 2201/004* (2013.01); *C08K 2201/005* (2013.01); *C08K 2201/014* (2013.01); *Y02W 30/92* (2015.05); *Y02W 30/94* (2015.05); *Y02W 30/97* (2015.05)

(58) Field of Classification Search
CPC ......... C04B 26/16; C04B 14/42; C04B 18/08; C04B 28/021; C04B 20/0048; C04B 20/1003; C04B 38/10; C08K 7/02; C08K 7/14; C08K 7/18; C08K 7/28; C08K 3/013; C08L 75/04
USPC ....................................................... 523/220
See application file for complete search history.

(56) References Cited

U.S. PATENT DOCUMENTS

| | | | |
|---|---|---|---|
| 529,535 | A | 11/1894 | Smith |
| 529,538 | A | 11/1894 | Vaughn |
| 2,526,033 | A | 10/1950 | Lyon |
| 2,817,875 | A | 12/1957 | Harris et al. |
| 2,902,388 | A | 9/1959 | Szukiewicz |
| 2,983,693 | A | 5/1961 | Sievers |
| 3,065,500 | A | 11/1962 | Berner |
| 3,071,297 | A | 1/1963 | Lee |
| 3,078,512 | A | 2/1963 | Haven |

(Continued)

FOREIGN PATENT DOCUMENTS

| | | |
|---|---|---|
| CA | 2037130 C | 1/2006 |
| CN | 1251596 A | 4/2000 |

(Continued)

OTHER PUBLICATIONS

Anonymous, "Cellular plastics made by extrusion." Research Disclosure, Journal No. 40204, Oct. 1997.

(Continued)

*Primary Examiner* — Hannah J Pak
(74) *Attorney, Agent, or Firm* — Bookoff McAndrews, PLLC

(57) ABSTRACT

Polyurethane composites and methods of preparing polyurethane composites are described herein. The polyurethane composite can comprise (a) a polyurethane formed by the reaction of (i) one or more isocyanates selected from the group consisting of diisocyanates, polyisocyanates, and mixtures thereof, and (ii) one or more polyols; (b) fly ash comprising 50% or greater by weight, fly ash particles having a particle size of from 0.2 micron to 100 microns; and (c) a coarse filler material comprising 80% or greater by weight, filler particles having a particle size of from greater than 250 microns to 10 mm. The coarse filler material can be present in the composite in an amount of from 1% to 40% by weight, based on the total weight of the composite. The weight ratio of the fly ash to the coarse filler material can be from 9:1 to 200:1.

10 Claims, 2 Drawing Sheets

(56) References Cited

U.S. PATENT DOCUMENTS

| | | |
|---|---|---|
| 3,223,027 A | 12/1965 | Soda et al. |
| 3,262,151 A | 7/1966 | Oxel |
| 3,269,961 A | 8/1966 | Bruson et al. |
| 3,308,218 A | 3/1967 | Wiegand et al. |
| 3,466,705 A | 9/1969 | Carlton |
| 3,499,848 A | 3/1970 | Morey |
| 3,528,126 A | 9/1970 | Rudolf et al. |
| 3,566,448 A | 3/1971 | Rudolf |
| 3,619,268 A | 11/1971 | Robertson et al. |
| 3,642,964 A | 2/1972 | Rausch, Jr. et al. |
| 3,644,168 A | 2/1972 | Bonk et al. |
| 3,698,731 A | 10/1972 | Jost et al. |
| 3,726,624 A | 4/1973 | Schwarz |
| 3,736,081 A | 5/1973 | Yovanovich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Flood et al. |
| 3,832,429 A | 8/1974 | Charpentier |
| 3,841,390 A | 10/1974 | DiBenedetto et al. |
| 3,843,757 A | 10/1974 | Ehrenfreund et al. |
| 3,852,387 A | 12/1974 | White et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 3,999,320 A | 12/1976 | Zaubzer |
| 4,005,035 A | 1/1977 | Deaver |
| 4,038,238 A | 7/1977 | Cravens |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schafer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer et al. |
| 4,137,200 A | 1/1979 | Wood et al. |
| 4,137,265 A | 1/1979 | Edwards et al. |
| 4,141,662 A | 2/1979 | Hepper et al. |
| 4,141,862 A | 2/1979 | Raden et al. |
| 4,143,759 A | 3/1979 | Paradis |
| 4,149,840 A | 4/1979 | Tippmann |
| 4,153,766 A | 5/1979 | Koide et al. |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Baker et al. |
| 4,165,414 A | 8/1979 | Narayan et al. |
| 4,180,538 A | 12/1979 | Mizutani et al. |
| 4,200,699 A | 4/1980 | Treadwell |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | Illger et al. |
| 4,241,131 A | 12/1980 | Bailey |
| 4,243,755 A | 1/1981 | Marx et al. |
| 4,247,656 A | 1/1981 | Janssen |
| 4,248,957 A | 2/1981 | Sander et al. |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Mueller et al. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulbert, Jr. |
| 4,284,826 A | 8/1981 | Aelony |
| 4,290,248 A | 9/1981 | Kemerer et al. |
| 4,300,776 A | 11/1981 | Taubenmann |
| 4,330,494 A | 5/1982 | Iwata et al. |
| 4,330,634 A | 5/1982 | Rodaway |
| 4,331,726 A | 5/1982 | Cleary |
| 4,338,422 A | 7/1982 | Jackson, Jr. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,378,171 A | 3/1983 | Schmidt |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | Labelle et al. |
| 4,421,871 A | 12/1983 | Korczak et al. |
| 4,439,548 A | 3/1984 | Weisman |
| 4,450,133 A | 5/1984 | Cafarelli |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,521,428 A | 6/1985 | Nisato et al. |
| 4,532,098 A | 7/1985 | Campbell et al. |
| 4,540,357 A | 9/1985 | Campbell et al. |
| 4,546,120 A | 10/1985 | Peerman et al. |
| 4,568,702 A | 2/1986 | Mascioli |
| 4,576,718 A | 3/1986 | Reischl et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,649,162 A | 3/1987 | Roche et al. |
| 4,661,533 A | 4/1987 | Stobby |
| 4,667,157 A | 5/1987 | Ciammaichella et al. |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,728,287 A | 3/1988 | Niems |
| 4,728,288 A | 3/1988 | Niems |
| 4,737,524 A | 4/1988 | Ako et al. |
| 4,757,095 A | 7/1988 | Galan et al. |
| 4,758,602 A | 7/1988 | Trowell |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,823,195 A | 4/1989 | Ito |
| 4,826,429 A | 5/1989 | Niems |
| 4,826,944 A | 5/1989 | Hoefer et al. |
| 4,832,183 A | 5/1989 | Lapeyre |

(56) References Cited

U.S. PATENT DOCUMENTS

| | | |
|---|---|---|
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,033,860 A | 7/1991 | Nakamura |
| 5,047,495 A | 9/1991 | Kolycheck |
| 5,051,222 A | 9/1991 | Marten et al. |
| 5,053,274 A | 10/1991 | Jonas |
| 5,064,293 A | 11/1991 | Nakamura |
| 5,075,417 A | 12/1991 | Trowell et al. |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,128,379 A | 7/1992 | Stone |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,186,539 A | 2/1993 | Manser et al. |
| 5,229,138 A | 7/1993 | Carotti |
| 5,252,697 A | 10/1993 | Jacobs et al. |
| 5,271,699 A | 12/1993 | Barre et al. |
| 5,278,195 A | 1/1994 | Volkert et al. |
| 5,295,545 A | 3/1994 | Passamaneck |
| 5,296,545 A | 3/1994 | Heise |
| 5,296,546 A | 3/1994 | Kishida et al. |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,401,785 A | 3/1995 | Kumagai et al. |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,451,615 A | 9/1995 | Birch |
| 5,453,231 A | 9/1995 | Douglas |
| 5,455,312 A | 10/1995 | Heidingsfeld et al. |
| 5,458,477 A | 10/1995 | Kemerer et al. |
| 5,489,646 A | 2/1996 | Tatman et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,512,319 A | 4/1996 | Cook et al. |
| 5,514,430 A | 5/1996 | Andersen et al. |
| 5,522,446 A | 6/1996 | Mullet et al. |
| 5,527,172 A | 6/1996 | Graham, Jr. |
| 5,532,065 A | 7/1996 | Gubitz et al. |
| 5,536,781 A | 7/1996 | Heidingsfeld et al. |
| 5,554,713 A | 9/1996 | Freeland |
| 5,556,458 A | 9/1996 | Brook et al. |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Bräuer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Mueller et al. |
| 5,700,495 A | 12/1997 | Kemerer et al. |
| 5,710,231 A | 1/1998 | Fogg et al. |
| 5,721,699 A | 2/1998 | Devilbiss |
| 5,723,506 A | 3/1998 | Glorioso et al. |
| 5,728,337 A | 3/1998 | Yoshikawa et al. |
| 5,759,695 A | 6/1998 | Primeaux, II |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,791,085 A | 8/1998 | Szmidt et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,844,015 A | 12/1998 | Steilen et al. |
| 5,862,144 A | 1/1999 | Lee et al. |
| 5,908,573 A | 6/1999 | Chiles et al. |
| 5,908,701 A | 6/1999 | Jennings et al. |
| 5,929,153 A | 7/1999 | Mori et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Primeaux, II |
| 5,981,655 A | 11/1999 | Heidingsfeld et al. |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,044,512 A | 4/2000 | Hornby et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,136,246 A | 10/2000 | Rauwendaal et al. |
| 6,136,870 A | 10/2000 | Triolo et al. |
| 6,140,381 A | 10/2000 | Rosthauser et al. |
| 6,166,109 A | 12/2000 | Spitler et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,234,777 B1 | 5/2001 | Sperry et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,271,276 B1 | 8/2001 | Gribble et al. |
| 6,284,841 B1 | 9/2001 | Friesner |
| 6,294,637 B1 | 9/2001 | Bräuer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,321,904 B1 | 11/2001 | Mitchell |
| 6,329,448 B1 | 12/2001 | Gutsche et al. |
| 6,331,577 B1 | 12/2001 | Volkert et al. |

(56) References Cited

U.S. PATENT DOCUMENTS

| | | |
|---|---|---|
| 6,343,924 B1 | 2/2002 | Klepsch |
| 6,348,514 B1 | 2/2002 | Calabrese et al. |
| 6,362,252 B1 | 3/2002 | Prutkin |
| 6,383,599 B1 | 5/2002 | Bell et al. |
| 6,387,504 B1 | 5/2002 | Mushovic |
| 6,409,949 B1 | 6/2002 | Tanaka et al. |
| 6,422,926 B1 | 7/2002 | McLain et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,495,772 B2 | 12/2002 | Anstrom et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,586,490 B1 | 7/2003 | Dietrich et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,613,823 B1 | 9/2003 | Battiste et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,641,658 B1 | 11/2003 | Dubey |
| 6,649,084 B2 | 11/2003 | Morikawa et al. |
| 6,649,667 B2 | 11/2003 | Clatty et al. |
| 6,686,435 B1 | 2/2004 | Petrovic et al. |
| 6,695,902 B2 | 2/2004 | Hemmings et al. |
| 6,706,774 B2 | 3/2004 | Munzenberger et al. |
| 6,767,399 B2 | 7/2004 | Peev et al. |
| 6,769,220 B2 | 8/2004 | Friesner |
| 6,832,430 B1 | 12/2004 | Ogawa et al. |
| 6,841,111 B2 | 1/2005 | Rickner et al. |
| 6,849,676 B1 | 2/2005 | Shibano et al. |
| 6,855,844 B1 | 2/2005 | Geiger et al. |
| 6,864,296 B2 | 3/2005 | Kurth |
| 6,867,239 B2 | 3/2005 | Kurth |
| 6,871,457 B2 | 3/2005 | Quintero-Flores et al. |
| 6,881,763 B2 | 4/2005 | Kurth |
| 6,881,764 B2 | 4/2005 | Doesburg et al. |
| 6,903,156 B2 | 6/2005 | Mueller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,063,877 B2 | 6/2006 | Kurth et al. |
| 7,132,459 B1 | 11/2006 | Buchel |
| 7,160,976 B2 | 1/2007 | Luhmann et al. |
| 7,188,992 B2 | 3/2007 | Mattingly et al. |
| 7,196,124 B2 | 3/2007 | Parker et al. |
| 7,211,206 B2 | 5/2007 | Brown et al. |
| 7,241,818 B2 | 7/2007 | Hemmings et al. |
| 7,267,288 B2 | 9/2007 | Wheeler et al. |
| 7,316,559 B2 | 1/2008 | Taylor |
| 7,316,659 B2 | 1/2008 | Lofberg |
| 7,491,351 B2 | 2/2009 | Taylor et al. |
| 7,579,068 B2 | 8/2009 | Allen et al. |
| 7,651,645 B2 | 1/2010 | Taylor |
| 7,763,341 B2 | 7/2010 | Brown |
| 7,776,934 B2 | 8/2010 | Lekovic et al. |
| 7,794,224 B2 | 9/2010 | Butteriss et al. |
| 7,879,144 B2 | 2/2011 | Hemmings et al. |
| 8,024,818 B1 | 9/2011 | Davenport |
| 8,030,364 B2 | 10/2011 | Kim et al. |
| 8,088,217 B2 | 1/2012 | Francis |
| 8,114,267 B2 | 2/2012 | Nordlinder et al. |
| 8,177,909 B2 | 5/2012 | Constantz et al. |
| 8,209,927 B2 * | 7/2012 | Cottier ............... C04B 28/02 |
| | | 52/309.3 |
| 8,209,977 B2 | 7/2012 | Klimes et al. |
| 8,227,656 B2 | 7/2012 | Svetlik |
| 8,313,802 B2 | 11/2012 | Riman et al. |
| 8,846,776 B2 | 9/2014 | Herrington et al. |
| 8,889,754 B2 | 11/2014 | Rodrigo et al. |
| 8,931,230 B2 | 1/2015 | Negri et al. |
| 9,481,759 B2 * | 11/2016 | Herrington ........ C08G 18/4288 |
| 9,745,224 B2 * | 8/2017 | Hill ..................... B32B 13/12 |
| 9,752,015 B2 * | 9/2017 | Kumar ..................... C08K 3/00 |
| 9,944,063 B1 * | 4/2018 | Lakrout ................. B32B 37/14 |
| 10,030,126 B2 * | 7/2018 | Kumar ................... C08L 75/04 |
| 2001/0009683 A1 | 7/2001 | Kitahama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0119300 A1 | 8/2002 | Taylor |
| 2002/0122929 A1 | 9/2002 | Simpson et al. |
| 2002/0171164 A1 | 11/2002 | Halterbaum et al. |
| 2002/0192456 A1 | 12/2002 | Mashburn et al. |
| 2002/0193493 A1 | 12/2002 | Symons |
| 2003/0004232 A1 | 1/2003 | Ruede |
| 2003/0021915 A1 | 1/2003 | Rohatgi et al. |
| 2003/0047836 A1 | 3/2003 | Rickner et al. |
| 2003/0065045 A1 | 4/2003 | Falke et al. |
| 2003/0083394 A1 | 5/2003 | Clatty |
| 2003/0090016 A1 | 5/2003 | Petrovic et al. |
| 2003/0143910 A1 | 7/2003 | Mashburn et al. |
| 2003/0158365 A1 | 8/2003 | Brauer et al. |
| 2003/0166735 A1 | 9/2003 | Clatty et al. |
| 2003/0204016 A1 | 10/2003 | Arntz et al. |
| 2003/0232933 A1 | 12/2003 | Lagneaux et al. |
| 2004/0014830 A1 | 1/2004 | Wiese et al. |
| 2004/0048055 A1 | 3/2004 | Branca |
| 2004/0049002 A1 | 3/2004 | Andrews et al. |
| 2004/0121161 A1 | 6/2004 | Shugert et al. |
| 2004/0122119 A1 | 6/2004 | Burgess et al. |
| 2004/0144287 A1 | 7/2004 | Tardif et al. |
| 2004/0162360 A1 | 8/2004 | Kiso et al. |
| 2004/0176486 A1 | 9/2004 | Glorioso, Jr. |
| 2004/0198900 A1 | 10/2004 | Madaj |
| 2004/0206276 A1 | 10/2004 | Hill et al. |
| 2004/0247857 A1 | 12/2004 | Schroeder et al. |
| 2004/0266993 A1 | 12/2004 | Evans |
| 2005/0011159 A1 | 1/2005 | Standal et al. |
| 2005/0013793 A1 | 1/2005 | Beckman et al. |
| 2005/0031578 A1 | 2/2005 | Deslauriers et al. |
| 2005/0032925 A1 | 2/2005 | Kaplan |
| 2005/0070620 A1 | 3/2005 | Herrington et al. |
| 2005/0079339 A1 | 4/2005 | Riddle |
| 2005/0119414 A1 * | 6/2005 | Sasagawa ................. C08F 8/00 |
| | | 525/242 |
| 2005/0131092 A1 | 6/2005 | Kurth et al. |
| 2005/0131093 A1 | 6/2005 | Kurth et al. |
| 2005/0161855 A1 | 7/2005 | Brown et al. |
| 2005/0163939 A1 | 7/2005 | Moehl et al. |
| 2005/0171243 A1 | 8/2005 | Hemmings et al. |
| 2005/0182228 A1 | 8/2005 | Kurth |
| 2005/0197413 A1 | 9/2005 | Grimm et al. |
| 2005/0208167 A1 | 9/2005 | You et al. |
| 2005/0222303 A1 | 10/2005 | Cernohous |
| 2005/0260351 A1 | 11/2005 | Kurth et al. |

(56) References Cited

U.S. PATENT DOCUMENTS

| | | |
|---|---|---|
| 2005/0281999 A1 | 12/2005 | Hofmann et al. |
| 2005/0287238 A1 | 12/2005 | Taylor |
| 2006/0003042 A1 | 1/2006 | Inoue et al. |
| 2006/0011159 A1 | 1/2006 | Bloms et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani |
| 2006/0071369 A1 | 4/2006 | Butteriss et al. |
| 2006/0131791 A1 | 6/2006 | Nakamura et al. |
| 2006/0217517 A1 | 9/2006 | Daly |
| 2006/0235100 A1 | 10/2006 | Kaushiva et al. |
| 2006/0270747 A1 | 11/2006 | Griggs |
| 2006/0273486 A1 | 12/2006 | Taylor et al. |
| 2007/0022106 A1 | 1/2007 | Brandt et al. |
| 2007/0027227 A1 | 2/2007 | Shutov |
| 2007/0037953 A1 | 2/2007 | Geiger et al. |
| 2007/0052128 A1 | 3/2007 | Taylor |
| 2007/0056875 A1 | 3/2007 | Hlady et al. |
| 2007/0066697 A1 | 3/2007 | Gilder et al. |
| 2007/0078191 A1 | 4/2007 | Guhde et al. |
| 2007/0197672 A1 | 8/2007 | Lekovic et al. |
| 2007/0222105 A1 | 9/2007 | Brown |
| 2007/0225391 A1 | 9/2007 | Brown |
| 2007/0261947 A1 | 11/2007 | Geerlings et al. |
| 2008/0004361 A1 | 1/2008 | Palermo |
| 2008/0119578 A1 | 5/2008 | Prince et al. |
| 2008/0132611 A1 | 6/2008 | Brown |
| 2008/0237914 A1 | 10/2008 | Lustiger et al. |
| 2008/0241458 A1 | 10/2008 | Jenkines |
| 2009/0053490 A1* | 2/2009 | Clausi .................. C08G 18/10 428/213 |
| 2009/0069117 A1 | 3/2009 | Kennedy, III et al. |
| 2009/0198036 A1 | 8/2009 | Duffy |
| 2009/0295021 A1 | 12/2009 | Brown |
| 2010/0022717 A1 | 1/2010 | Honma et al. |
| 2010/0025882 A1 | 2/2010 | Taylor et al. |
| 2010/0116179 A1 | 5/2010 | Baker et al. |
| 2010/0132296 A1* | 6/2010 | Bootier .................. B29C 44/22 52/546 |
| 2010/0201014 A1 | 8/2010 | Taylor |
| 2010/0286312 A1 | 11/2010 | Zhang et al. |
| 2011/0059319 A1 | 3/2011 | Raday |
| 2011/0086931 A1 | 4/2011 | Herrington et al. |
| 2011/0086932 A1 | 4/2011 | Herrington |
| 2011/0086933 A1 | 4/2011 | Herrington et al. |
| 2011/0086934 A1 | 4/2011 | Herrington et al. |
| 2011/0182799 A1 | 7/2011 | Riman et al. |
| 2011/0303156 A1 | 12/2011 | Sikka et al. |
| 2012/0029145 A1 | 2/2012 | Brown |
| 2012/0085264 A1 | 4/2012 | Zhang et al. |
| 2012/0216952 A1 | 8/2012 | Bushendorf et al. |
| 2012/0312194 A1 | 12/2012 | Riman et al. |
| 2013/0059934 A1 | 3/2013 | Burgess et al. |
| 2013/0065980 A1 | 3/2013 | Yoshitomi |
| 2013/0072588 A1 | 3/2013 | Rosthauser et al. |
| 2013/0122267 A1 | 5/2013 | Riman et al. |
| 2013/0206040 A1 | 8/2013 | Zhang et al. |
| 2013/0284069 A1 | 10/2013 | Dubey |
| 2013/0284070 A1 | 10/2013 | Dubey et al. |
| 2014/0349104 A1 | 11/2014 | Hill et al. |
| 2015/0267029 A1 | 9/2015 | Hill et al. |
| 2016/0052168 A1 | 2/2016 | Li |
| 2016/0053078 A1 | 2/2016 | Dubey et al. |
| 2017/0114211 A1 | 4/2017 | Kumar et al. |

FOREIGN PATENT DOCUMENTS

| | | |
|---|---|---|
| CN | 1052991 C | 5/2000 |
| CN | 1926282 A | 3/2007 |
| CN | 101033642 A | 9/2007 |
| DE | 2351844 A1 | 4/1975 |
| DE | 9318515 U1 | 2/1994 |
| EP | 0115374 A2 | 8/1984 |
| EP | 0654297 A1 | 5/1995 |
| EP | 0771827 A2 | 5/1997 |
| EP | 1336461 A1 | 8/2003 |
| GB | 790527 A | 2/1958 |
| GB | 1152306 A | 5/1969 |
| GB | 1246940 A | 9/1971 |
| GB | 1314707 A | 4/1973 |
| GB | 1356641 A | 6/1974 |
| GB | 1456641 A | 11/1976 |
| GB | 2300627 A | 11/1996 |
| GB | 2347933 A | 9/2000 |
| GB | 2454990 A | 5/2009 |
| JP | S5580456 A | 6/1980 |
| JP | S58132533 A | 8/1983 |
| JP | S6322819 A | 1/1988 |
| JP | S63202408 A | 8/1988 |
| JP | H0776395 A | 3/1995 |
| JP | H07313941 A | 12/1995 |
| JP | H08157638 A | 6/1996 |
| JP | H08188634 A | 7/1996 |
| JP | H11171960 A | 6/1999 |
| JP | 2001326361 A | 11/2001 |
| JP | 2004131654 A | 4/2004 |
| JP | 2005138567 A | 6/2005 |
| KR | 20020086327 A | 11/2002 |
| NZ | 226301 A | 3/1990 |
| WO | WO-8103026 A1 | 10/1981 |
| WO | WO-8705541 A1 | 9/1987 |
| WO | WO-9100304 A1 | 1/1991 |
| WO | WO-9207892 A1 | 5/1992 |
| WO | WO-9319110 A1 | 9/1993 |
| WO | WO-9324549 A1 | 12/1993 |
| WO | WO-9425529 A1 | 11/1994 |
| WO | WO-9427697 A1 | 12/1994 |
| WO | WO-9711114 A1 | 3/1997 |
| WO | WO-9744373 A1 | 11/1997 |
| WO | WO-9808893 A1 | 3/1998 |
| WO | WO-9937592 A1 | 7/1999 |
| WO | WO-9939891 A1 | 8/1999 |
| WO | WO-0017249 A1 | 3/2000 |
| WO | WO-0040650 A1 | 7/2000 |
| WO | WO-0118087 A1 | 3/2001 |
| WO | WO-0172863 A1 | 10/2001 |
| WO | WO-0185140 A1 | 11/2001 |
| WO | WO-0201530 A2 | 1/2002 |
| WO | WO-02068490 A1 | 9/2002 |
| WO | WO-2004078900 A1 | 9/2004 |
| WO | WO-2004113248 A2 | 12/2004 |
| WO | WO-2005053938 A1 | 6/2005 |
| WO | WO-2005056267 A1 | 6/2005 |
| WO | WO-2005072187 A2 | 8/2005 |
| WO | WO-2005094255 A2 | 10/2005 |
| WO | WO-2005123798 A1 | 12/2005 |
| WO | WO-2006012149 A2 | 2/2006 |
| WO | WO-2006137672 A1 | 12/2006 |
| WO | WO-2008089481 A1 | 7/2008 |
| WO | WO-2011019997 A1 | 2/2011 |
| WO | WO-2011020004 A1 | 2/2011 |
| WO | WO-2011085365 A1 | 7/2011 |
| WO | WO-2013049401 A2 | 4/2013 |
| WO | WO-2014168633 A1 | 10/2014 |
| WO | WO-2016018226 A1 | 2/2016 |
| WO | WO-2016022103 A1 | 2/2016 |
| WO | WO-2016118141 A1 | 7/2016 |

OTHER PUBLICATIONS

Anonymous, "Rigid polyurethane foams having a strut/window mass ratio in the range of 90/10 to 10/90, made via extrusion." Research Disclosure, Journal No. 40264, Oct. 1997.

International Search Report and Written Opinion for Application No. PCT/US2015/060403, dated Jul. 29, 2016, 12 pages.

Inukai et al., "Glass Fiber Reinforced Rigid Polyurethane Foam (Eslon Neo-Lumber FFU)", International Progress in Urethanes, Technomic Publishing Co., Inc., Lancaster, PA, 1988, vol. 5, pp. 202-216.

(56) References Cited

OTHER PUBLICATIONS

Ionescu M., "Chemistry and Technology of Polyols for Polyurethanes," Rapra Technology Ltd, 2005, pp. 535-550, Table of Contents.
Klempner D., ed., et al., Excerpts from Handbook of Polymeric Foams and Foam Technology, 2nd ed., 2004, pp. 121-124, 126, 128, 129, Hanser Publishers, Munich.
Krishnamurthi B., et al., Nano-and Micro-Fillers for Polyurethane Foams: Effect on Density and Mechanical Properties, Symposium, Sep. 30-Oct. 3, 2001, Polyurethanes Expo 2001, Columbus, OH, pp. 239-244.
Morimoto et al., "Continuous Glass Fiber Reinforced Rigid Polyurethane Foam (Airlite FRU)", International Progress in Urethanes, Technomic Publishing Co., Inc., Lancaster, Pennsylvania, 1988, vol. 5, pp. 82-101.
International Preliminary Report on Patentability for Application No. PCT/US2015/060403, dated May 15, 2018, 8 pages.
Nosker et al., "Fiber Orientation and Creation of Structural Plastic Lumber," Plastics Engineering, Jun. 1999, pp. 53-56.
Oertel G., ed., Polyurethane Handbook Second Edition, Carl Hanser, Verlag, Munich, 1994, pp. 136, 182-183, 252-253.
Okagawa et al., "Glass Fiber Reinforced Rigid Polyurethane Foam, Cellular and non cellular polyurethanes," 1980, Carl Hanser Verlag Munchen Wien Druck and Bindung, Germany, pp. 453-467.
Okagawa et al., "Glass Fiber Reinforced Rigid Polyurethane Foam", International Progress in Urethane, Technomic Publishing Co., Inc., Lancaster, Pennsylvania, 1980, vol. 2, pp. 85-97.
Rama., et al., "Studies on Physicomechanical properties of Fly Ash-filled Hydroxyl-terminated Polyurethane-toughened Epoxy Composites," Journal of Reinforced Plastics and Composites, Feb. 2010, vol. 29 (14), pp. 2099-2104.
Randall D., ed., et. al., Excerpts from "The polyurethanes book", 2002, Dunholm Publicity Ltd., United Kingdom, pp. 1, 166-167, 210-213, 229-231, 263-264.
Shutov F.A., Excerpts from Integral/Structural Polymer Foams: Technology, Properties and Applications, 1986, Pages including preface, 3-4, 8-9, 13, 23-25, 131-134, 153-158, 167, 171, 176-179, 256.
Guhanathan S., et al., "Studies on Castor Oil-Based Polyurethane/ Polyacrylonitrile Interpenetrating Polymer Network for Toughening of Unsaturated Polyester Resin," Journal of Applied Polymer Science, Wiley Subscription Services, New Jersey, Apr. 2004, vol. 92 (2), pp. 817-829.
Javni I., et al., "Thermal Stability of Polyurethanes Based on Vegetable Oils," Journal of Applied Polymer Science, John Wiley & Sons, New York, Aug. 22, 2000, vol. 77 (8), pp. 1723-1734.
Standard Practice for Polyurethane Raw Materials: Polyurethane Foam Cup Test, ASTM 07487-08, 2008.
Szycher, Michael., 17.7.1 Foam Production by Extruder Method. Szycher's Handbook of Polyurethanes, Copyright 1999 by CRC Press LLC, pp. 17-21-17-22.
Woods G., Excerpts from "The ICI Polyurethanes Boor", 1987, The Netherlands, pp. 119-120, 127, 135-140, 158-159.
Wypych G., Excerpts from "Fillers", 1993, ChemTech Publishing, Ontario Canada, pp. 4, 48, 57.

* cited by examiner

POLYURETHANE COMPOSITES WITH FILLERS

This application is a continuation of U.S. application Ser. No. 15/301,083, filed on Sep. 30, 2016, which is a U.S. national stage filing under 35 U.S.C. § 371 of International Application No. PCT/US2015/060403, filed on Nov. 12, 2015, each incorporated by reference herein in its entirety.

FIELD OF THE DISCLOSURE

This disclosure relates generally to polyurethane composites, more particularly, to the use of size-graded fillers including a fine filler such as fly ash and a coarse filler in polyurethane composites.

BACKGROUND OF THE DISCLOSURE

Polymeric composites that contain organic and/or inorganic filler materials have become desirable for a variety of uses because of their excellent mechanical properties and weathering stability. In general, the superior properties of the polymeric composites are achieved through use of the polymer as the matrix material that acts as a glue with enhanced flexural properties or as a fibrous component providing reinforcement and improved tensile properties. The inorganic material imparts various properties of rigidity, toughness, hardness, optical appearance and interaction with electromagnetic radiation, density, and many other physical and chemical attributes. A proper blend of polymeric and inorganic materials provides for a composite with optimal properties at a desirably low cost.

Polyurethane composites composed of a polyurethane binder and fly ash filler with glass fiber reinforcement have been shown to be very useful. Specific uses of such composites include applications as interior and exterior cladding on buildings. However, one challenge for highly-filled filler-polyurethane composites is that it is very difficult to improve the mechanical performance of such materials without incurring significant costs. Another challenge is that there exists a threshold for the total content of the fly ash filler and reinforcement materials that can be incorporated into the composites. In particular, raising the content of fly ash filler and/or reinforcement materials can greatly increase the viscosity of the polyurethane mixture and eventually make such systems difficult to process and manufacture into gross and net shapes. There is a need to improve the properties of filled composites. The compositions and methods described herein address these and other needs.

SUMMARY OF THE DISCLOSURE

Polyurethane composites and methods of preparing polyurethane composites are described herein. The polyurethane composites can comprise (a) a polyurethane formed by the reaction of (i) one or more isocyanates selected from the group consisting of diisocyanates, polyisocyanates, and mixtures thereof, and (ii) one or more polyols; (b) fly ash comprising 50% or greater by weight, fly ash particles having a particle size of from 0.2 micron to 100 microns; and (c) a coarse filler material comprising 80% or greater by weight, filler particles having a particle size of from greater than 250 microns to 10 mm.

The polyurethane can be present in an amount of from 15% to 60% by weight, based on the total weight of the composite. In some examples, the polyurethane can be present in an amount of from 15% to 40% by weight, based on the total weight of the composite. In some embodiments, 50% or more of the one or more polyols can have a hydroxyl number of 250 mg KOH/g or greater. In some embodiments, 50% or more of the one or more polyols can include 75% or more primary hydroxyl groups based on the total number of hydroxyl groups in the polyol. The one or more polyols can comprise an aromatic polyester polyol, an aromatic polyether polyol, or a combination thereof.

The coarse filler material can be present in the composite in an amount of from 1% to 40% (for example, 1 to 30%) by weight, based on the total weight of the composite. In some embodiments, 80% or greater by weight of the coarse filler material comprises filler particles having particle size of from greater than 250 microns to 1 mm, for example, 300 microns to 500 microns. Suitable coarse filler materials can include silica sand, silica fume, cement, slag, metakaolin, talc, mica, wollastonite, limestone, calcium carbonate, perlite, clay, shale, ceramic, glass, seed hull, organic waste, or combinations thereof. In some examples, the coarse filler material includes expanded glass or sand. In some embodiments, the coarse filler material can be coated with an agent selected from surfactants, bonding agents, pigments, and combinations thereof.

Fly ash can be present in the composite in an amount of from 20% to 90% (for example, 20% to 80% or 50% to 80%) by weight, based on the total weight of the composite. In some examples, fly ash can be present in the composite in an amount of from 20% to 80% or 50% to 80% by weight, based on the total weight of the composite. In some embodiments, the fly ash can be Class C fly ash. In some examples, the fly ash can have a particle size distribution comprising a first mode having a median particle diameter from 0.3 micron to 1 micron, a second mode having a median particle diameter from 10 microns to 25 microns, and a third mode having a median particle diameter from 40 microns to 80 microns.

The weight ratio of the fly ash to the coarse filler material can be from 9:1 to 200:1, such as from 9:1 to 150:1.

The polyurethane composite can further comprise a fiber material. The fiber material can be present in an amount of from 1% to 20% by weight, based on the total weight of the composite. Examples of suitable fiber materials include polyacrylonitrile fibers, polyamide fibers, polyester fibers, glass fibers, mineral wool, rayon, cellulose, wood fibers, saw dust, wood shavings, cotton, lint, polypropylene fibers, polyethylene fibers, polyacrylic fibers, or combinations thereof. In some embodiments, the fiber material can include a plurality of glass fibers. The glass fibers can have an average length of 1 mm or greater, for example, from 1.5 mm to 30 mm.

In some embodiments, the polyurethane composite can be foamed. The density of the polyurethane composites described herein can be from 5 lb/ft$^3$ to 70 lb/ft$^3$. The composite can have a flexural strength of 300 psi or greater, as measured by ASTM C1185.

Building materials comprising the polyurethane composites described herein are disclosed. The building material can include siding materials, carpet backings, building panels, sheets, architectural moldings, sound barriers, thermal barriers, insulation, wall board, ceiling tiles, ceiling boards, soffit, and roofing materials.

Methods of making the polyurethane composites described herein are disclosed. The method can include (a) mixing (1) one or more isocyanates selected from the group consisting of diisocyanates, polyisocyanates, and mixtures thereof, (2) one or more polyols, (3) fly ash comprising 50% or greater by weight, fly ash particles having a particle size of from 0.2 micron to 100 microns, and (4) a coarse filler material comprising 80% or greater by weight, filler particles having a particle size of from 250 microns to 10 mm to form a mixture; and (b) allowing the one or more isocyanates and the one or more polyols to react in the presence of the fly ash and the coarse filler material to form the polyurethane composite. In some embodiments, the polyurethane mixture can further include a catalyst.

DETAILED DESCRIPTION

Figure 1:
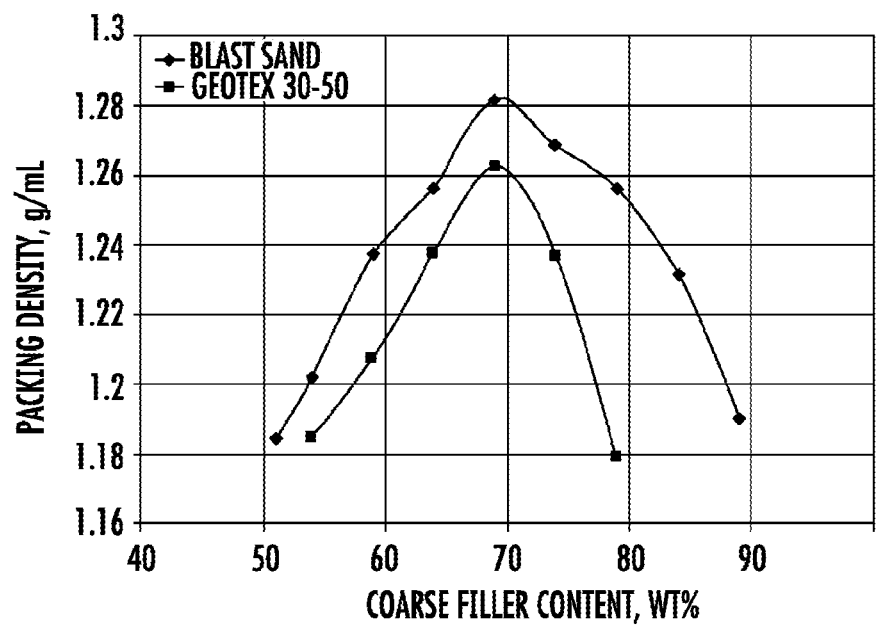
FIG. 1 is a graph showing the packing density of blends of fly ash and coarse filler materials as a function of the coarse filler content.

Polyurethane composites and methods of preparing polyurethane composites are described herein. The polyurethane composites can comprise a polyurethane formed using highly reactive systems such as highly reactive polyols, isocyanates, or both.

Isocyanates suitable for use in the polyurethane composite described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties,* $2^{nd}$ Edition, Ed: Gunter Ocrtel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanates; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein can be between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

The one or more polyols for use in the polyurethane composite can include polyester polyols, polyether polyols, or combinations thereof. In some embodiments, the one or more polyols can include 50% or more of one or more highly reactive (i.e., first) polyols. For example, the one or more polyols can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g. 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Exemplary dialkanolamines include diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt. % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

In some embodiments, the one or more first polyols can include an aromatic polyester polyol, an aromatic polyether polyol, or a combination thereof. In some embodiments, the one or more first polyols include an aromatic polyester polyol such as those sold under the TEROL® trademark (e.g., TEROL® 198).

Examples of highly reactive polyols also include Pel-Soy 744 and Pel-Soy P-750, soybean oil based polyols commercially available from Pelron Corporation; Agrol Diamond, a soybean oil based polyol commercially available from BioBased Technologies; Ecopol 122, Ecopol 131 and Ecopol 132, soybean oil polyols formed using polyethylene terephthalate and commercially available from Ecopur Industries; Stepanpol PD-110 LV and PS 2352, polyols based on soybean oil, diethylene glycol and phthallic anhydride and commercially available from Stepan Company; Voranol 280, 360 and WR2000, polyether polyols commercially available from Dow Chemical Company; Honey Bee HB-530, a soybean oil-based polyol commercially available from MCPU Polymer Engineering; Renewpol, commercially available from Styrotech Industries (Brooklyn Park, Minn.); JeffAdd B 650, a 65% bio-based content (using ASTM D6866-06) additive based on soybean oil commercially available from Huntsman Polyurethanes; Jeffol SG 360, a sucrose and glycerin-based polyol commercially available from Huntsman Polyurethanes; and derivatives thereof. For example, Ecopol 131 is a highly reactive aromatic polyester polyol comprising 80% primary hydroxyl groups, a hydroxyl number of 360-380 mg KOH/g, i.e., and a primary hydroxyl number of 288-304 mg KOH/g.

The one or more polyols for use in the polyurethane composites can include one or more plant-based polyols. In some embodiments, the plant-based polyols are highly reactive polyols. The one or more plant-based polyols useful in the polyurethane composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the polyurethane composites include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the one or more polyols are non-plant-based polyols.

In some embodiments, the one or more polyols include a less reactive polyol. For example, the polyurethane composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40%/0 or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-1 ION, 222-056, 232-027, 232-034, and 232-035, commercially available from Dow.

The one or more polyol can include 50% or less of one or more less reactive polyols in addition to the one or more highly reactive polyols. For example, the one or more polyol can include less than 45%, less than 40%, less than 35%, less than 30%, less than 25%, less than 20%, less than 15%, less than 10%, or less than 5%, of one or more less reactive polyols.

The one or more polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the one or more polyol can be from about 100 to 600, 150 to 550, 200 to 500, 250 to 440, 300 to 415, and 340 to 400.

The polyurethane composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the one or more polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the additional isocyanate-reactive monomer can include an alkanolamine. The alkanolamine can be a dialkanolamine, a trialkanolamine, or a combination thereof. Suitable dialkanolamines include dialkanolamines which include two hydroxy-substituted $C_1$-$C_2$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL® TEAP-265 and CARPOL® TEAP-335 (Carpenter Co., Richmond, Va.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The additional isocyanate-reactive monomer (when used) can be present in varying amounts relative the one or more polyol used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyol.

As indicated herein, in the polyurethane composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane composite.

The polyurethane can be present in the composite in amounts from 10% to 60% based on the weight of polyurethane composite. For example, the polyurethane can be included in an amount from 15% to 60% or 20% to 50% by weight, based on the weight of the polyurethane composite. In some embodiments, the polyurethane in the polyurethane composites can be present in an amount of 10% or greater, 15% or greater, 20% or greater, 25% or greater, 30% or greater, 35% or greater, 40% or greater, 45% or greater, 50% or greater, or 55% or greater by weight, based on the weight of polyurethane composite. In some embodiments, the polyurethane in the polyurethane composites can be present in an amount of 60% or less, 55% or less, 50% or less, 45% or less, 40% or less, 35% or less, 30% or less, 25% or less, 20% or less, or 15% or less by weight, based on the weight of polymeric composite.

The polyurethane composites can include a particulate filler. In some examples, the particulate filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein.

In some embodiments, the particle size distribution of the fly ash can include 50% or greater of fly ash particles by weight having a diameter of from 0.2 micron to 100 microns. For example, 55% or greater, 60% or greater, 65% or greater, 70% or greater, 75% or greater, 80% or greater, 85% or greater, or 90% or greater of the fly ash particles by weight can have a diameter of from 0.2 micron to 100 microns. In some embodiments, 50% or greater of the fly ash can have a particle diameter of 100 microns or less, 95 microns or less, 90 microns or less, 85 microns or less, 80 microns or less, 75 microns or less, 70 microns or less, 65 microns or less, 60 microns or less, 55 microns or less, 50 microns or less, and can have a particle diameter of 0.2 microns or more, 0.3 microns or more, 0.4 microns or more, 0.5 microns or more, 0.7 microns or more, 1 micron or more, 2 microns or more, 5 microns or more, or 10 microns or more. In some examples, the 50% or greater of the fly ash can have a particle diameter of from 0.2 microns to 100 microns, 0.2 microns to 90 microns, or 0.3 microns to 80 microns, 1 to 60 microns, or 5 to 50 microns.

In some embodiments, the fly ash can have a particle size distribution with at least three modes. For example, the particle size distribution of the fly ash can be three, four, five, or more modes. Alternatively, the fly ash can be blended with another fly ash to modify the properties of the fly ash to produce a fly ash having a particle size distribution with at least three modes.

The fly ash particle size distribution can include a first mode having a median particle diameter of 2.0 microns or less. In some examples, the median particle size of the first mode can be 0.3 microns to 1.5 microns, 0.4 microns to 1 microns, or 0.5 microns to 0.8 microns (e.g., 0.7 microns).

The fly ash particle size distribution can include a second mode having a median particle diameter of from 3 microns to less than 40 microns. In some examples, the median particle size of the second mode can be from 5 microns to 35 microns, 10 microns to 30 microns, or 10 microns to 25 microns. The fly ash particle size distribution can include a third mode having a median particle diameter of 40 microns or greater. In some examples, the median particle size of the third mode can be from 40 microns to less than 100 microns, for example from 40 microns to 90 microns, 40 microns to 80 microns, or from 40 microns to 75 microns. In some embodiments, the fly ash particle size distribution can include a first mode having a median particle diameter of from 0.3 microns to 1.0 micron, a second mode having a median particle diameter of from 10 microns to 25 microns, and a third mode having a median particle diameter of from 40 microns to 80 microns. In some examples, the fly ash can also include an additional ultrafine mode with a median particle diameter of from 0.05 microns to 0.2 microns.

In some embodiments, the particle size distribution can include 11-17% of the particles by volume in the first mode, 56-74% of the particles by volume in the second mode, and 12-31% of the particles by volume in the third mode. The ratio of the volume of particles in the second and third modes to the volume of particles in the first mode can be from 4.5 to 7.5.

The fly ash can be present in the polyurethane composites in amounts from 20% to 90% by weight. In some embodiments, the fly ash can be present in amounts from 35% to 80% such as from 50% to 80% or from 50% to 75% by weight. Examples of the amount of fly ash present in the composites described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight.

The particulate filler can include an additional filler material. The additional filler material can include a coarse filler material or a combination of coarse filler materials. The coarse filler material can be any natural or synthetic material, based on inorganic materials, organic materials, or combinations of both. In some embodiments, the coarse filler material can include silica sand, silica fume, cement, slag, metakaolin, talc, mica, wollastonite, limestone, calcium carbonate, perlite, clay (e.g., kaolin), shale, ceramic, glass, seed hull, organic waste, or combinations thereof. In some embodiments, the coarse filler can include an organic material, such as a recycled polymeric material. Suitable examples include pulverized polymeric foam or recycled rubber material. In some examples, the coarse filler material can include expanded glass. In other examples, the coarse filler material can include sand. In some embodiments, the coarse filler is not fly ash.

In some embodiments, 80% or greater of the coarse filler particles by weight have a particle diameter of from greater than 250 microns to 10 mm, greater than 250 microns to 5 mm, greater than 250 microns to 2 mm, greater than 250 microns to 1 mm, or 250 microns to 500 microns. For example, the coarse filler material can include 85% or greater, 90% or greater, or 95% or greater of filler particles by weight having a particle diameter of from 250 microns to 10 mm, 250 microns to 5 mm, 250 microns to 2 mm, 250 microns to 1 mm, or 250 microns to 500 microns. In some embodiments, 80% or greater of the coarse filler particles have a particle diameter of 250 microns or greater, 300 microns or greater, or 350 microns or greater, and a particle diameter of 10 mm or less, 8 mm or less, 5 mm or less, 4 mm or less, 3 mm or less, 2 mm or less, 1 mm or less, or 500 microns or less.

In some embodiments, the particle size distribution of the coarse filler material can include having a diameter of from 250 microns to 10 mm.

The coarse filler material can be present in the polyurethane composite in any suitable amount to confer a desirable property to the polyurethane composite. The coarse filler material can be present in the polyurethane composite in amounts from 0.1% to 50% by weight, based on the total weight of the composite. For example, the coarse filler material can be in amounts of from 1% to 40%, 1% to 30%, 1% to 20%, or 1% to 10% by weight, based on the total weight of the composite. In some embodiments, the coarse filler material can be present in the polyurethane composite in amounts of 0.1% or greater, 0.5% or greater, 1% or greater, 1.25% or greater, 1.5% or greater, 2% or greater, 3% or greater, 4% or greater, or 5% or greater by weight, based on the total weight of the composite. In some embodiments, the coarse filler material can be present in the polyurethane composite in amounts of 50% or less, 40% or less, 30% or less, 20% or less, 15% or less, 10% or less, 8% or less, or 5% or less by weight, based on the total weight of the composite.

The weight ratio of the fly ash to the coarse filler material can be 1:1 or greater. For example, the weight ratio of the fly ash to the coarse filler material can be from 1:1 to 200:1, 5:1 to 200:1, 9:1 to 200:1, 9:1 to 150:1, 9:1 to 100:1, 9:1 to 80:1, or 9:1 to 50:1. In some embodiments, the weight ratio of the fly ash to the coarse filler material can be 2:1 or greater, 5:1 or greater, 9:1 or greater, 10:1 or greater, 20:1 or greater, 30:1 or greater, 40:1 or greater, 50:1 or greater, 60:1 or greater, or 70:1 or greater. In some embodiments, the weight ratio of the fly ash to the coarse filler material can be 200:1 or less, 175:1 or less, 150:1 or less, 125:1 or less, 100:1 or less, 75:1 or less, or 50:1 or less.

In some embodiments, a fiber material can be included in the polyurethane composite, e.g., to provide increased strength, stiffness or toughness. The fiber material can be any natural or synthetic fiber material, based on inorganic materials, organic materials, or combinations of both. Fiber materials suitable for use with the polyurethane composite described herein can be present in the form of individual fibers, fabrics, rovings, or tows. Exemplary fiber materials that can be used in the polyurethane composite include mineral wool fibers such as stone wool, slag wool, or ceramic fiber wool. The mineral wool fibers can be synthetic or can be obtained from molten mineral such as lava, rock or stone. Other suitable inorganic fiber materials include basalt fibers, alumina silica fibers, aluminum oxide fibers, silica fibers, carbon fibers, metal fibers, and combinations thereof. Exemplary organic fiber materials that can be used in the polyurethane composite include hemp fibers, sisal fibers, cotton fibers, straw, reeds, or other grasses, jute, bagasse fibers, abaca fibers, flax, southern pine fibers, wood fibers, cellulose, saw dust, wood shavings, lint, vicose, leather fibers, rayon, and mixtures thereof. Other suitable organic fiber materials include synthetic fibers such as, Kevlar, viscose fibers, polyamide fibers, polyacrylonitrile fibers, Dralon® fibers, polyethylene fibers, polypropylene fibers, polyvinyl alcohol fibers, polyacrylic fibers, polyester fibers, aramid fibers, carbon fibers, or combinations thereof. In some embodiments, the polyurethane composites can include a combination of fibers that break and fibers that do not break when the composite is fractured by external stress.

The fiber material (when used) can be present in the polyurethane composites in amounts from 0.5% to 20% by weight, based on the weight of polyurethane composite. For example, the fiber material can be present in amounts from 1% to 20%, 1% to 10%, 1.5% to 8%, 2% to 6%, or 2% to 4% by weight, based on the weight of the polyurethane composite.

In some embodiments, the polyurethane composites can comprise a plurality of glass fibers as the fiber material. Glass fibers can include fibrous glass such as E-glass, C-glass, S-glass, and AR-glass fibers. In some examples, fire resistant or retardant glass fibers can be included to impart fire resistance or retarding properties to the polyurethane composites. The glass fibers can be from 1 mm to 50 mm in average length. In some examples, the glass fibers are from 1.5 mm to 30 mm, from 2 mm to 30 mm, from 3 mm to 30 mm, or from 3 mm to 15 mm in average length. In some examples, the average length of the glass fibers in the polyurethane composites can be 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. The glass fibers in the polyurethane composites can have any dimension of from 1 μm to 30 μm in average diameter. For example, the average diameter of the glass fibers can be 1.5 μm to 30 μm, 3 μm to 20 μm, 4 μm to 18 μm, or 5 μm to 15 μm in average diameter. The glass fibers can be provided in a random orientation or can be axially oriented.

In some embodiments, the fibers, coarse filler material, and/or the fly ash can be coated with a composition to modify their reactivity. For example, the fibers, coarse filler material, and/or the fly ash can be coated with a sizing agent. In some embodiments, the fibers, coarse filler material, and/or the fly ash can be coated with a composition for promoting adhesion. U.S. Pat. No. 5,064,876 to Hamada et al. and U.S. Pat. No. 5,082,738 to Swofford, for example, disclose compositions for promoting adhesion. In some embodiments, the fibers, coarse filler material, and/or the fly ash are surface coated with a composition comprising a silane compound such as aminosilane. U.S. Pat. No. 4,062,999 to Kondo et al. and U.S. Pat. No. 6,602,379 to Li et al. describe suitable aminosilane compounds for coating fibers. In some embodiments, the polyurethane composites can include a combination of coated and uncoated fibers, coarse filler material, and/or the fly ash. In some examples, the coarse filler material can be coated with an aminosilane.

Additional components useful with the polyurethane composite can include foaming agents, blowing agents, surfactants, chain-extenders, crosslinkers, coupling agents, UV stabilizers, fire retardants, antimicrobials, anti-oxidants, and pigments. For example, the fibers, coarse filler material, and/or the fly ash can be coated with a surfactant, bonding agent, pigment, or combinations thereof. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composite in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the polyurethane composite includes less than 0.5% by weight water.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the composite described herein. These reactants help the polyurethane system to distribute and contain the fly ash, coarse filler material, and/or fibers within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a cross-linker or chain-extender may be used to replace at least a portion of the one or more polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of the particulate filler such as fly ash and/or the coarse filler material and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments like carbon black powder. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

Methods of preparing the polyurethane composites are described herein. The polyurethane composites can be formed by the reaction of one or more isocyanate, selected from the group consisting of diisocyanates, polyisocyanates, and mixtures thereof, and one or more polyol, in the presence of a coarse filler material, fly ash, and optionally, a fiber material and/or a catalyst. In some embodiments, the polyurethane composite can be produced by mixing the one or more isocyanates, the one or more polyols, the coarse filler material, and the fly ash, in a mixing apparatus such as a high speed mixer or an extruder. In some embodiments, mixing can be conducted in an extruder. The materials can be added in any suitable order. For example, in some embodiments, the mixing stage of the method used to prepare the polyurethane composite can include: (1) mixing the polyol, coarse filler material, and fly ash; (2) mixing the isocyanate with the polyol, coarse filler material, and fly ash; and optionally (3) mixing the catalyst with the isocyanate, the polyol, the coarse filler material, and the fly ash. The optional fiber material can be added at the same time as the coarse filler material or fly ash, or can be added prior to, during, or after stage (2) or (3).

The polyurethane composite mixture can be blended in any suitable manner to obtain a homogeneous or heterogeneous blend of the one or more isocyanate, one or more polyol, fly ash, coarse filler material, optional fiber, and optional catalyst. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The mixture can then be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

Incorporation of the coarse filler material into the filled polyurethane mixture (that is, the polyol, isocyanate, coarse filler material, and fly ash) can decrease the viscosity of the mixture. In some embodiments, it is desirable that the composite mixture has a viscosity below a particular threshold at the desired loadings so it can be effectively processed. In some embodiments, the coarse filler material can be present in the composite mixture in amounts to produce a workable viscosity of from 25 Pa·s to 250 Pa·s. For example, the coarse filler material in the composite mixture can be in amounts to produce a workable viscosity from 30 Pa·s to 250 Pa·s, 65 Pa·s to 250 Pa·s, or 80 Pa·s to 250 Pa·s. In some embodiments, the working viscosity can be less than 250

Pa·s, less than 225 Pa·s, less than 200 Pa·s, less than 175 Pa·s, less than 150 Pa·s, less than 140 Pa·s, less than 130 Pa·s, less than 120 Pa·s, or less than 110 Pa·s. The polyurethane mixture may be processed at an elevated temperature (e.g., 200-500° F.) to form a melt and to allow the mixture to have a workable viscosity. In some embodiments, the fly ash and/or the coarse filler material are heated before mixing with the polyurethane. The viscosity of the composite mixture can be measured using a Thermo Electron Corporation Haake Viscometer.

In some embodiments, the composite mixture described herein can be foamed. The polyol and the isocyanate can be allowed to produce a foamed composite material after mixing the components according to the methods described herein. The composite materials can be formed while they are actively foaming or after they have foamed. For example, the material can be placed under the pressure of a mold cavity prior to or during the foaming of the composite material.

Incorporation of the coarse filler material in the polyurethane composite can increase the flexural strength of a composite, compared to a composite without the coarse filler material. In some embodiments, the flexural strength of the polyurethane composites can be increased by at least 10%, for example, 15% or greater, 20% or greater, 25% or greater, 30% or greater, 35% or greater, 50% or greater, 75% or greater, or even 100% or greater, compared to a composite without coarse filler materials.

The flexural strength of the polyurethane composites described herein can be 300 psi or greater. For example, the flexural strength of the polyurethane composites can be 500 psi or greater, 700 psi or greater, 900 psi or greater, 1000 psi or greater, 1100 psi or greater, 1200 psi or greater, 1300 psi or greater, 1400 psi or greater, 1500 psi or greater, or 1600 psi or greater. The flexural strength can be determined by the load required to fracture a rectangular prism loaded in the three point bend test as described in ASTM C1185-08 (2012).

Incorporation of the coarse filler material in the polyurethane composite can increase the packing density of the fillers in the composite, compared to a composite without the coarse filler material. In some embodiments, the packing density of the fillers in the polyurethane composites can be increased by at least 0.5%, for example, 0.7% or greater, 1% or greater, 1.5% or greater, 2% or greater, 3% or greater, 5% or greater, or 8% or greater, compared to the packing density of fillers in a composite without coarse filler materials. The packing density of the fillers in the polyurethane composites described herein can be 1.1 g/ml or greater. For example, the packing density of the polyurethane composites can be 1.2 g/ml or greater, or 1.3 g/ml or greater. The packing density can be determined by packing the composite materials into a graduated cylinder held onto a table vibrated by a Syntron magnetic vibrator for several minutes until the material no longer reduces in volume, then calculating the density. The method is modified based on tapped density obtained using ASTM D7481-09.

The granulometry of the coarse filler material and/or fly ash can be determined by a variety of techniques. For example, analysis of the particle size distribution of the fly ash or coarse filler material can be conducted using a Horiba LA-300 laser interferometer with isopropanol dispersion media. The multimodal distribution can be analyzed into its component parts by mathematical deconvolution using a computer program such as MATLAB® from Mathworks.

The optimization of various properties, such as density and flexural strength, of the composite allows their use in building materials and other structural applications. For example, the polyurethane composites can be formed into shaped articles and used in building materials include siding materials, roofing materials such as roof coatings and roof tiles, architectural moldings, sheets, decking materials, synthetic lumber, sound barrier/insulation, thermal barriers, carpet backing, fencing materials, marine lumber, flexible or rigid foams such as automotive foams (e.g., for dashboard, seats or roofing), component coatings, and other shaped articles. Examples of shaped articles made using composite materials described herein include roof tile shingles, trim boards, building panels, scaffolding, cast molded products, doors, door parts, moldings, sills, stone, masonry, brick products, posts, signs, guard rails, retaining walls, park benches, tables, slats, corner arches, columns, wall boards, ceiling tiles, ceiling boards, soffits, and railroad ties. The polyurethane composites described herein further can be used as reinforcement of composite structural members including building materials such as doors, windows, furniture, and cabinets and for well and concrete repair. The polyurethane composites described herein also can be used to fill gaps, particularly to increase the strength of solid surface articles and/or structural components. The polyurethane composites can be flexible, semi-rigid or rigid foams. In some embodiments, the flexible foam is reversibly deformable (i.e. resilient) and can include open cells. An 8"×1"×1" piece of a flexible foam can generally wrap around a 1" diameter mandrel at room temperature without rupture or fracture. Flexible foams also generally have a density of less than 5 lb/ft$^3$ (e.g. 1 to 5 lb/ft$^3$).

In some embodiments, the rigid foam is irreversibly deformable and can be highly crosslinked and/or can include closed cells. Rigid foams generally have a density of 5 lb/ft$^3$ or greater.

In some embodiments, the overall density of the polyurethane composites and/or the molded articles described herein can be 2 lb/ft$^3$ or greater. For example, the overall density can be 5 lb/ft$^3$ to 75 lb/ft$^3$, 10 lb/ft$^3$ to 70 lb/ft$^3$, 15 lb/ft$^3$ to 65 lb/ft$^3$, 20 lb/ft$^3$ to 60 lb/ft$^3$, 25 lb/ft$^3$ to 55 lb/ft$^3$, or 10 lb/ft to 35 lb/ft$^3$.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts are parts by weight, temperature is in ° C. or is at ambient temperature, and pressure is at or near atmospheric.

Effect of Blast Sand or Geotex Filler Materials on Packing Density

The packing density of mixtures of fly ash and blast sand of Geotex filler was determined by fly ash and filler material (in amounts disclosed in FIG. 1) into a graduated cylinder held onto a table vibrated by a Syntron magnetic vibrator for several minutes until the material no longer reduces in volume, then the density was calculated.

Results:

FIG. 1 shows the vibrated density of a blend of fly ash and coarse filler materials (blast sand from Keller Materials, TX and Geotex 30-50, a marble limestone/calcium carbonate filler supplied by Huber Engineered Materials, IL) with various percentages of the coarse filler in the blend. The blast sand has an equivalent particle size diameter range from 100 micrometer to 300 micrometer. The Geotex 30-50 has an equivalent particle size diameter range from 200 micrometer to 500 micrometer. Vibrated (compacted) density is measured by packing filler materials into a graduated cylinder held onto a table vibrated by a Syntron magnetic vibrator for several minutes until the filler materials no longer reduce in volume, then calculating the density. As demonstrated, the addition of coarse filler materials increases the packing density and reduces the porosity in the composite system, thus requiring less polyurethane to fill the pores and allowing more polyurethane available to wet the particles.

Effect of Blast Sand or Geotex Filler Materials on the Viscosity of Polyurethane Composites Method:

Polyol compositions used to simulate highly filled polyurethane systems were prepared by mixing a polyol blend containing 30% by weight CARPOL® MX-425 (Mannich base polyether polyol), 19.7% by weight CARPOL® GP-725 (alkylene oxide-capped glycerine), 19.3% by weight CARPOL® GSP-355 (sucrose-based polyether polyol), 19% by weight TEROL® 352 (aromatic polyester polyol), and 10% by weight EDAP-800 (ethylene diamine, propylene oxide and ethylene oxide based polyether polyol) to produce a polyol mixture. Fly ash and blast sand or Geotex filler materials (in the amounts disclosed in FIG. 2), were added and wetted with the liquid solution. The viscosity of the filler/polyol mixture was then determined.

Figure 2:
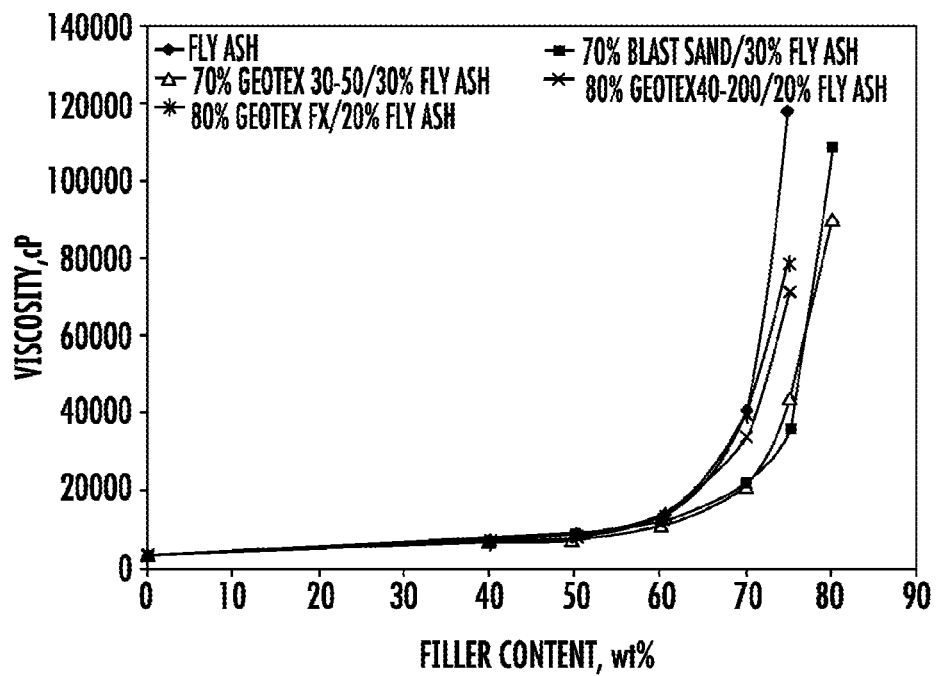
FIG. 2 is a graph showing the viscosity of a filled polyurethane composition as a function of the coarse filler material content. The coarse filler materials include Geotex 30-50, Geotex 40-200, and Geotex FX.

Results:

FIG. 2 shows the viscosity of the filler-polyurethane system decreases significantly with addition of the filler material(s), even to almost one order of magnitude in some cases. For example, the viscosity of a 75% fly ash/25% polyol blend has a viscosity of about 140,000 cP, while that of a 52.5% fly ash/22.5% blast sand/25% polyol has a viscosity of only about 30,000. Therefore, by utilization of a coarse filler material or a mixture of coarse filler materials, the workability of the starting mixture of a highly-filled polyurethane composite material can be dramatically improved, thus making the manufacturing process of such materials much easier.

Effect of Blast Sand or Poraver Filler Materials on Polyurethane Composite

Methods:

Polyurethane composites were prepared using blast sand, obtained from Keller Materials, TX, USA, or Poraver, obtained from North America Inc, Innisfil, Ontario. The Poraver materials are a family of lightweight expanded glass/clay materials. The composites were prepared by mixing a polyol blend containing 30% by weight CARPOL® MX-425 (Mannich base polyether polyol), 19.7% by weight CARPOL® GP-725 (alkylene oxide-capped glycerine), 19.3% by weight CARPOL® GSP-355 (sucrose-based polyether polyol), 19% by weight TEROL® 352 (aromatic polyester polyol), and 10% by weight EDAP-800 (ethylene diamine, propylene oxide and ethylene oxide based polyether polyol) to produce a polyol mixture. The polyol mixture was then mixed with 1% by weight of an amine catalyst (diethanolamine), and 2% by weight of a silicone surfactant (Tegostab B-8870) in an extruder. Fly ash, glass fiber, and blast sand or Poraver were added and wetted with the liquid solution. Methylene diphenyl diisocyanate (MDI; 104 index; 51.5 g) was then added to the extruder, and simultaneously stirring began. The mixture was extruded into a belt molding system and allowed to cure. The resultant composites included 23 parts by weight polyurethane, 70 parts by weight fly ash, 7 parts by weight glass fiber, and the weight percentage of blast sand or Poraver provided in Tables 1 and 2. The physical properties of the resultant composites, including flexural strength and density were determined.

TABLE 1

The flexural strength and density of highly-filled polyurethane with various addition levels of blast sand.

| Addition Level, wt % | Flexural Strength, psi | Density, pcf |
| --- | --- | --- |
| 0  | 1066 | 32.7 |
| 10 | 1076 | 36.3 |
| 15 | 1142 | 38.4 |
| 20 | 1406 | 37.1 |
| 25 | 1209 | 40.8 |
| 30 | 1344 | 41.1 |

TABLE 2

The flexural strength and density of highly-filled polyurethane with various addition levels of Poraver filler (0.5-1 mm, 0.2-0.5 mm and 0.1-0.3 mm).

| 0.5-1 mm | | | 0.2-0.5 mm | | | 0.1-0.3 mm | | |
| --- | --- | --- | --- | --- | --- | --- | --- | --- |
| Addition Level, wt % | Flexural Strength, psi | Density, pcf | Addition Level, wt % | Flexural Strength, psi | Density, pcf | Addition Level, wt % | Flexural Strength, psi | Density, pcf |
| 1 | 1117 | 35.3 | 1 | 1073 | 35.1 | 1 | 1117 | 35.0 |
| 2 | 1194 | 36.5 | 2 | 1206 | 35.4 | 2 | 1167 | 36.2 |
| 3 | 1089 | 35.5 | 3 | 1356 | 36.3 | 3 | 1295 | 36.4 |
| 4 | 1477 | 37.2 | 4 | 1233 | 37.0 | 4 | 1047 | 36.4 |
| 5 | 1577 | 37.6 | 5 | 1337 | 37.2 | 5 | 1269 | 37.5 |
| 6 | 1580 | 37.8 | 6 | 1472 | 38.0 | 6 | 1236 | 36.9 |

Figure 3:
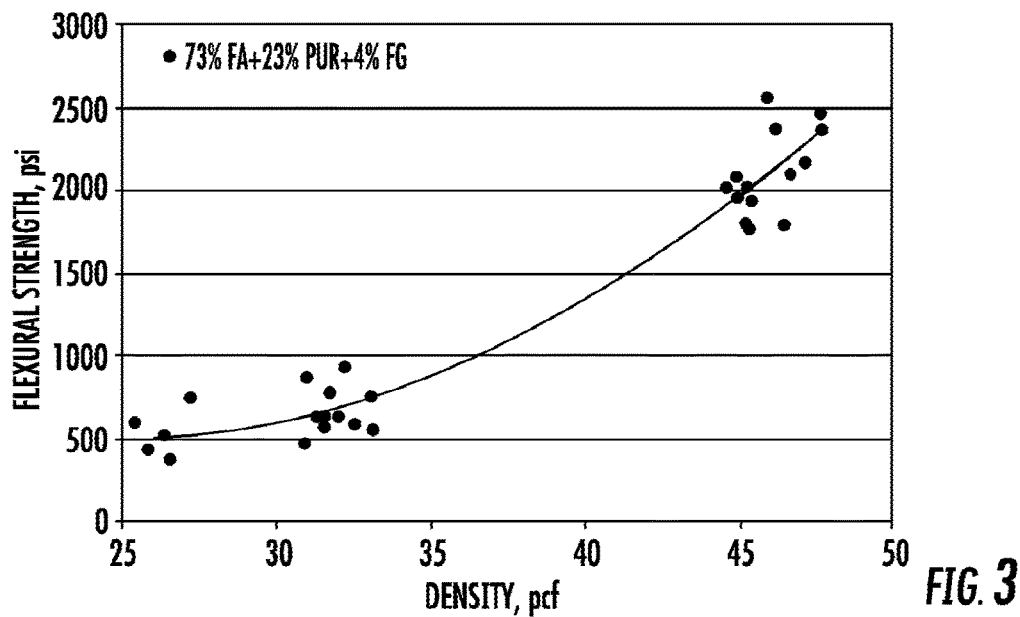
FIG. 3 is a graph showing the flexural strength of polyurethane composites as a function of density.

Results:

Tables 1 and 2 describe the flexural strength and density of highly filled polyurethane composite materials with different levels of addition of blast sand and Poraver materials, respectively. A flexural strength of about 1400 psi was achieved with 20% by weight addition of blast sand at a density of 37.1 pcf, 4% by weight addition of Poraver 0.5-1 mm at a density of 37.2 pcf and 6% by weight addition of Poraver 0.2-0.5 mm at a density of 38 pcf, compared to about 1000 psi at similar density level for the control formulation (FIG. 3). In FIG. 3, FA is fly ash; PUR is polyurethane from polyol and methyl diisocyanate; and FG is chopped fiber glass.

Summary:

In addition to the advantage in processing of the starting mixture of the final composite, the use of coarse filler materials in highly-filled polyurethane composite also improves the mechanical properties such as flexural strength while permitting a reduction in cost of the composite. The addition of the coarse filler material also improves the packing of filler particles in the filler-fiber-polyurethane system and makes the structure denser and stronger. Because the total porosity is reduced, less polyurethane is required to form an optimal structure for satisfactory performance and thus reduces the cost of the composite products without compromising the mechanical properties. The reduced porosity allows for a greater amount of the polyol and MDI mixture available to coat particles and form the struts of the composite.

Effect of Glass Fibers on Blast Sand or Poraver Filled Polyurethane Composite

Methods:

Polyurethane composites were prepared by mixing a polyol blend containing 30% by weight CARPOL® MX-425 (Mannich base polyether polyol), 19.7% by weight CARPOL® GP-725 (alkylene oxide-capped glycerine), 19.3% by weight CARPOL® GSP-355 (sucrose-based polyether polyol), 19% by weight TEROL®, 352 (aromatic polyester polyol), and 10% by weight EDAP-800 (ethylene diamine, propylene oxide and ethylene oxide based polyether polyol) to produce a polyol mixture. The polyol mixture was then mixed with 1% by weight of an amine catalyst (diethanolamine), and 2% by weight of a silicone surfactant (Tegostab B-8870) in an extruder. Fly ash, a coarse filler, and glass fibers (in the amounts disclosed in Table 3), were added and wetted with the liquid solution. Methylene diphenyl diisocyanate (MDI; 104 index; 51.5 g) was then added to the extruder, and simultaneously stirring began. The following mixtures were prepared: (1) fly ash only (23 wt/o polyurethane and 77 wt % of fillers and glass fiber) as provided in the first column of Table 3; (2) a blend of fly ash and blast sand with a weight ratio of 5:1 (20 wt % polyurethane and 80 wt % of fillers and glass fiber) as provided in the second column of Table 3; and (3) a blend of fly ash and Poraver 0.5-1 mm with a weight ratio of 25:1 (22.4% polyurethane and 77.6% wt % of fillers and glass fiber) as provided in the third column of Table 3.

The mixtures were extruded into a belt molding system and allowed to cure. The physical properties of the composites, including flexural strength and density were determined.

Figure 4:
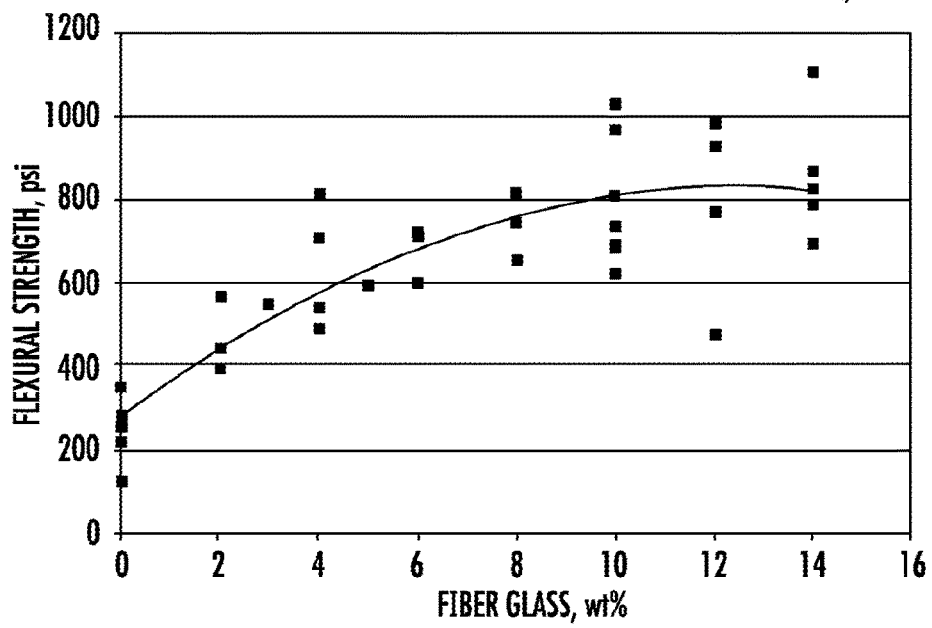
FIG. 4 is a graph showing the flexural strength of a fly ash filled polyurethane composite as a function of fiber glass content.

Results:

Table 3 lists the flexural strength and density of highly-filled polyurethane with various levels of glass fibers. It is shown that, the flexural strength of the composite with either blast sand or Poraver 0.5-1 mm increases to above 1500 psi when fiber glass contents increases, while that of the control formulation levels off at about 880 psi (See FIG. 4). The comparison of the control formulation without any coarse fillers and the formulations with secondary coarse fillers demonstrate the advantage of the improvement of the packing of the filler particles.

As shown in FIG. 3, the flexural strength of the inorganic-organic material with a composition of 73 wt % fly ash, 23% polyurethane and 4% fiber glass increases from about 800 psi at a density of 35 pcf to about 1250 psi at a density of 40 pcf and about 2000 psi at a density of 45 pcf. Although the mechanical performance can be enhanced by increasing the density, the cost can be higher if the composition of the filler-polyurethane is kept constant. Similarly, improvements in the mechanical performance of highly-filled polyurethane composites can be obtained by increasing the polyurethane content in the material. However, there is only a limited enhancement in flexural strength with this method. As shown in Table 4, the flexural strength only increases about 15% when the polyurethane content increases from 23% to 41%. There is improved handleability and extension with increases in the polyurethane component of the mixture. However, polyurethane is the most expensive ingredient in the composition, so the method of increasing polyurethane content is not an economical way to improve the mechanical performance of highly-filled polyurethane.

TABLE 4

The mechanical properties vs various polyurethane content (PUR: polyurethane).

| PUR Content, wt % | Flexural Strength, psi | Density, pcf | Handleability, in-lbf/in | Extension, in | Modulus, ksi |
|---|---|---|---|---|---|
| 23 | 2058 | 45.3 | 9.8 | 0.060 | 171 |
| 26 | 2258 | 44.1 | 13.7 | 0.062 | 209 |
| 29 | 1987 | 43.8 | 11.9 | 0.061 | 187 |
| 32 | 2382 | 43.5 | 16.8 | 0.072 | 193 |
| 35 | 2134 | 41.7 | 14.7 | 0.071 | 177 |
| 38 | 2091 | 41.4 | 16.7 | 0.082 | 149 |
| 41 | 2265 | 41.4 | 19.8 | 0.090 | 149 |

TABLE 3

The flexural strength and density of highly-filled polyurethane with various levels of glass fibers.

| Fly Ash | | | Fly Ash + Blast Sand | | | Fly Ash + Poraver 0.5-1 mm | | |
|---|---|---|---|---|---|---|---|---|
| Fiber Glass, wt % | Density, pcf | Flexural Strength, psi | Fiber Glass, wt % | Density, pcf | Flexural Strength, psi | Fiber Glass, wt % | Density, pcf | Flexural Strength, psi |
| 0 | 28.2 | 121 | 0 | 28.3 | 132 | 2 | 36.1 | 176 |
| 2 | 28.6 | 405 | 2 | 27.6 | 802 | 4 | 37.0 | 255 |
| 4 | 29.8 | 517 | 3 | 34.0 | 713 | 6 | 37.4 | 360 |
| 6 | 29.7 | 551 | 5 | 36.5 | 886 | 8 | 38.2 | 1361 |
| 8 | 32.9 | 798 | 7 | 37.6 | 1081 | 10 | 32.0 | 1232 |
| 10 | 32.7 | 614 | 9 | 38.5 | 1427 | 12 | 33.5 | 1548 |
| 12 | 35.2 | 822 | 11 | 38.7 | 1530 | 14 | 33.6 | 1338 |
| 14 | 35.4 | 880 | 12 | 38.7 | 1374 | | | |

Conclusion:

The partial volumetric replacement of fly ash by a coarse filler material or a combination of coarse filler materials increased the packing density of the filler particles in highly-filled polyurethane system and reduce the viscosity of the material, leading to improvements in the workability and mechanical performance of the polyurethane composites.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A composite material comprising:
    a polyurethane, wherein the polyurethane is present in an amount of 30% or less by weight based on the total weight of the composite material;
    particulate fillers, wherein the particulate fillers comprise coarse filler particles, wherein the composite material comprises at least 5% by weight coarse filler particles, based on the total weight of the composite material, and wherein 80% or greater of the coarse filler particles have a diameter of greater than 250 microns to 10 mm; and
    1% to 10% by weight of a glass fiber material, based on the total weight of the composite material;
    wherein the particulate fillers and the glass fiber material are dispersed within the polyurethane, and
    wherein a packing density of the particulate fillers in the polyurethane is 1.1 g/ml or greater.

2. The composite material of claim 1, wherein the glass fiber material is present in an amount of 1.5% to 8% by weight, based on the total weight of the composite material.

3. The composite material of claim 1, wherein the glass fiber material is in the form of a fabric, a roving, or a tow.

4. The composite material of claim 1, wherein the coarse filler particles comprise silica sand, silica fume, wollastonite, limestone, calcium carbonate, or combinations thereof.

5. The composite material of claim 1, wherein the polyurethane is present in an amount of from 20% to 30% by weight, based on the total weight of the composite material.

6. The composite material of claim 1, wherein the composite material further comprises a fire retardant.

7. The composite material of claim 1, wherein a density of the composite material is 20 lb/ft$^3$ to 60 lb/ft$^3$.

8. The composite material of claim 1, wherein a flexural strength of the composite material is greater than or equal to 1100 psi, as measured in accordance with ASTM C1185-08 (2012).

9. A building material comprising the composite material of claim 1, wherein the building material comprises a siding material, synthetic lumber, or a sheet material.

10. The composite material of claim 1, wherein the composite material is foamed.

* * * * *